(No Model.)
G. N. CLEMSON.
HACK SAW.
No. 603,128. Patented Apr. 26, 1898.
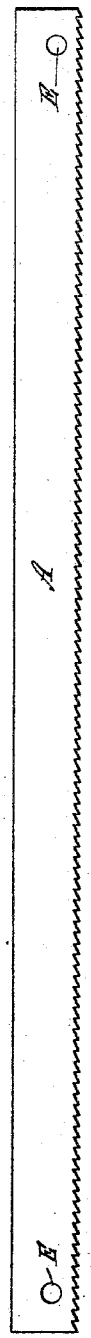
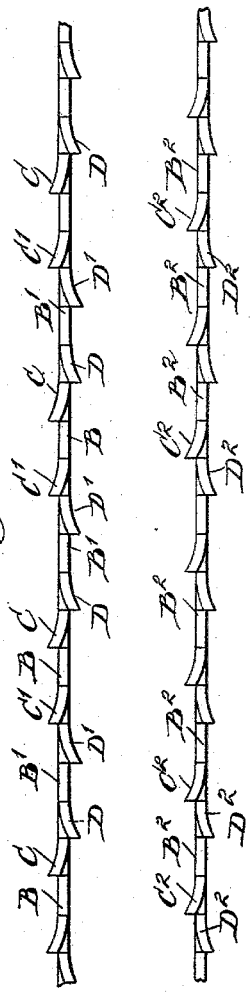
WITNESSES:
Edward Thorpe
Geo. J. Hoots
INVENTOR
G. N. Clemson
BY
ATTORNEYS.

UNITED STATES PATENT OFFICE.

GEORGE N. CLEMSON, OF MIDDLETOWN, NEW YORK.

HACK-SAW.

SPECIFICATION forming part of Letters Patent No. 603,128, dated April 26, 1898.

Application filed March 22, 1897. Serial No. 628,578. (No model.)

*To all whom it may concern:*

Be it known that I, GEORGE N. CLEMSON, of Middletown, in the county of Orange and State of New York, have invented a new and Improved Hack-Saw, of which the following is a full, clear, and exact description.

The object of the invention is to provide a new and improved hack-saw having its teeth arranged in such a manner that when the saw is used a clean straight cut is produced, and the teats now left on the bottom of the cut when using the hack-saw as heretofore constructed are completely removed.

The invention will be fully described hereinafter, and its novel features will be pointed out in the claims.

Reference is to be had to the accompanying drawings, forming a part of this specification, in which similar characters of reference indicate corresponding parts in all the figures.

Figure 1 is a side elevation of the improvement. Fig. 2 is an enlarged inverted plan view of the improvement, and Fig. 3 is a like view of part of the saw as heretofore constructed.

The blade A of the hack-saw is provided at its cutting edge with straight teeth B B' and pairs of set teeth C D and C' D', arranged to alternate in pairs with the straight teeth, as plainly illustrated in Fig. 2. The teeth C C' are set to one side of the saw, and the other teeth D D' are set in the opposite direction—that is, to the other side of the saw—but the teeth D only connect from one side of the saw with the teeth B', and only the teeth C' from the other side of the saw connect with the straight alternate teeth B—that is, between each two straight teeth there are two set teeth, one bent to one side of the straight teeth and the other in the opposite direction. The arrangement is reversed between each two succeeding straight teeth, so that at some places the set teeth connected directly to the straight teeth—that is, merging tangentially into the same—project to the right of the blade, while at other points the teeth so connected project to the left of the saw. It will be further observed that those set teeth C' and D, which merge tangentially into the straight teeth, are all located at the forward or cutting ends of the straight teeth, or, in other words, the outer ends of said set teeth all face forwardly or toward the same end of the blade. Thus the set teeth of succeeding pairs are arranged so as to connect alternately from opposite sides with the straight teeth in contradistinction to the pairs of teeth as heretofore constructed, in which only the set teeth from one side connect with the straight teeth, as illustrated in Fig. 3, in which the set teeth $C^2$, extending to one side of the saw, connect with all the straight teeth $B^2$, while the set teeth from the other side terminate at the set teeth $C^2$.

Now by the arrangement described and shown in Fig. 2 a very straight clean cut is produced when the saw is used, as the teeth do not leave teats in the bottom of the cut, as is the case with the saw heretofore used and illustrated in Fig. 3.

The blade A is provided at or near its ends with apertures E for connecting the blade with the usual devices carried by the bow-frame, and the said apertures are located below the middle line of the blade, so that the strain when the saw is used is on the lower cutting edge to prevent the blade from wabbling and twisting, so that a perfectly straight cut is insured.

Having thus fully described my invention, I claim as new and desire to secure by Letters Patent—

1. A saw having spaced straight teeth and set teeth in the spaces between the straight teeth, said straight teeth being connected directly at like ends partly to set teeth merging tangentially into said straight teeth and projecting to one side of the saw, and partly to set teeth likewise merging tangentially into said straight teeth but projecting to the other side of the saw, the outer ends of the set teeth so connected all facing in a like direction, or toward the same end of the saw, substantially as described.

2. A saw having spaced straight teeth, set teeth arranged in pairs between said straight teeth, the teeth of each pair being set to opposite sides of the saw, and the forward teeth of adjacent pairs being likewise set to opposite sides of the saw, sundry of the set teeth being connected directly to the adjacent straight teeth, the free ends or outer ends of the set teeth so connected all facing in the same direction, or toward the same end of the saw, substantially as described.

3. A saw having spaced teeth all alike in size and shape and set as follows: first tooth set to the right, second tooth unset or straight, third tooth set to the right, fourth tooth set to the left, fifth tooth unset or straight, sixth tooth set to the left and following ones repeated in the same order, substantially as described.

4. A hack-saw having spaced straight teeth and pairs of set teeth, the free or cutting ends of the teeth all pointing in the same direction, and the teeth being alike in shape and size, the pairs of set teeth alternating with the straight teeth and the teeth of each pair of set teeth being set to opposite sides of the saw, the forward teeth of adjacent pairs of set teeth being also set to opposite sides of the saw, and the rear teeth of adjacent pairs of set teeth being also set to opposite sides of the saw, the said rear teeth being connected directly to the adjacent straight teeth, substantially as described.

GEORGE N. CLEMSON.

Witnesses:
H. H. BLANCHARD,
F. B. HATHAWAY.